United States Patent
Leone et al.

(10) Patent No.: US 9,957,921 B2
(45) Date of Patent: May 1, 2018

(54) METHOD AND SYSTEM FOR CONTROLLING WATER INJECTION

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 15/285,311

(22) Filed: Oct. 4, 2016

(65) Prior Publication Data

US 2018/0094593 A1 Apr. 5, 2018

(51) Int. Cl.
| | |
|---|---|
| F02M 25/025 | (2006.01) |
| F02M 25/028 | (2006.01) |
| F02M 25/03 | (2006.01) |
| F02M 25/022 | (2006.01) |
| F02D 19/12 | (2006.01) |
| F02D 35/02 | (2006.01) |
| F02D 41/00 | (2006.01) |
| F02D 41/14 | (2006.01) |
| F02D 41/26 | (2006.01) |
| F01N 3/10 | (2006.01) |
| F02M 35/10 | (2006.01) |

(Continued)

(52) U.S. Cl.
CPC .......... *F02M 25/0227* (2013.01); *F01N 3/10* (2013.01); *F01N 13/10* (2013.01); *F02D 19/12* (2013.01); *F02D 35/027* (2013.01); *F02D 41/0077* (2013.01); *F02D 41/1446* (2013.01); *F02D 41/26* (2013.01); *F02M 25/025* (2013.01); *F02M 25/028* (2013.01); *F02M 25/0221* (2013.01); *F02M 25/03* (2013.01); *F02M 35/104* (2013.01); *F02M 35/10222* (2013.01)

(58) Field of Classification Search
CPC ..... F02D 19/12; F02D 35/027; F02M 25/028; F02M 25/0227; F02M 25/0221; F02M 25/03; F02M 25/025
USPC ............ 701/108; 123/25 R, 25 A, 25 C, 25 J
See application file for complete search history.

(56) References Cited

U.S. PATENT DOCUMENTS

| | | |
|---|---|---|
| 6,026,641 A | 2/2000 | Liberty |
| 9,291,125 B2 | 3/2016 | Yoshihara et al. |

(Continued)

OTHER PUBLICATIONS

Boeriu, Horatiu, "BMW 1 Series with Direct Water Injection—First Drive," http://www.bmwblog.com/201/07/02/ bmw-1-series-with-direct-water-injection-first-drive, Updated Jul. 2, 2015, 12 pages.

(Continued)

*Primary Examiner* — Mahmoud Gimie
(74) *Attorney, Agent, or Firm* — Julia Voutyras; McCoy Russell LLP

(57) ABSTRACT

Methods are provided for optimizing usage of water from a water injection system that injects water into the engine responsive to engine operating conditions such as knock, exhaust temperature, and dilution demand. An amount of water selected for injection purposes, as well as an order of water injection responsive to the various engine operating conditions, is varied based on a current water level relative to a predicted future water level. The method allows water usage benefits to be maximized particularly when water availability is limited.

20 Claims, 4 Drawing Sheets

(51) Int. Cl.
*F02M 35/104* (2006.01)
*F01N 13/10* (2010.01)

(56) References Cited

U.S. PATENT DOCUMENTS

| | | | | |
|---|---|---|---|---|
| 2007/0277775 | A1* | 12/2007 | Orlosky | F02B 47/02 |
| | | | | 123/25 C |
| 2010/0077986 | A1* | 4/2010 | Chen | F02M 25/0227 |
| | | | | 123/25 C |
| 2010/0121559 | A1 | 5/2010 | Bromberg et al. | |
| 2011/0108000 | A1* | 5/2011 | Williams | F02M 25/03 |
| | | | | 123/25 C |
| 2011/0174267 | A1 | 7/2011 | Sumilla et al. | |
| 2013/0218438 | A1 | 8/2013 | Sumilla et al. | |
| 2014/0202434 | A1 | 8/2014 | Leone et al. | |
| 2014/0366508 | A1 | 12/2014 | Ulrey et al. | |
| 2016/0032870 | A1* | 2/2016 | Nishida | F02M 25/03 |
| | | | | 123/25 C |
| 2016/0146163 | A1* | 5/2016 | Takada | F02M 26/30 |
| | | | | 123/568.12 |
| 2016/0258388 | A1* | 9/2016 | Nishida | F02D 41/0025 |

OTHER PUBLICATIONS

Bosch, Robert, "Ford GPTF: Water Injection," Gasoline Systems Presentation, Nov. 18, 2015, 15 pages.

Thewes, Matthias, et al., "Water Injection for Gasoline Combustion Systems," Efficient Engines, ATZ Live, vol. 76, pp. 10-15, 2012, 6 pages.

Leone, Thomas G., et al., "Method and System for Controlling Water Injection," U.S. Appl. No. 15/216,497, filed Jul. 21, 2016, 47 pages.

Leone, Thomas G., et al., "Method and System for Controlling Water Injection," U.S. Appl. No. 15/216,525, filed Jul. 21, 2016, 63 pages.

Leone, Thomas G., et al., "System and Methods for Extracting Water from an Electric Air Conditioning System for Water Injection," U.S. Appl. No. 15/271,954, filed Sep. 21, 2016, 51 pages.

Leone, Thomas G., et al., "System and Methods for Extracting Water from a Mechanical Air Conditioning Sytem for Water Injection," U.S. Appl. No. 15/272,017, filed Sep. 21, 2016, 44 pages.

Leone, Thomas G., et al., "System and Methods for Extracting Water from a HVAC System for Water Injection," U.S. Appl. No. 15/272,111, filed Sep. 21, 2016, 50 pages.

* cited by examiner

METHOD AND SYSTEM FOR CONTROLLING WATER INJECTION

FIELD

The present description relates generally to methods and systems for prioritizing water usage in an engine.

BACKGROUND/SUMMARY

Internal combustion engines may include water injection systems that inject water into a plurality of locations, such as into an intake manifold, upstream of engine cylinders, or directly into engine cylinders. Engine water injection provides various benefits such as an increase in fuel economy and engine performance, as well as a decrease in engine emissions. In particular, when water is injected into the engine intake or cylinders, heat is transferred from the intake air and/or engine components to evaporate the water, leading to charge cooling and engine dilution. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, improved wide-open throttle performance, decreased heat transfer losses, and decreased exhaust temperature. As a result, fuel efficiency is increased. Additionally, greater volumetric efficiency may lead to increased torque. Furthermore, lowered combustion temperature with water injection may reduce NOx emissions, while a more efficient fuel mixture (less enrichment) may reduce carbon monoxide and hydrocarbon emissions.

Engine control systems may select when to use water injection based on engine operating conditions, such as engine knock limitations. One example approach is shown by Surnilla et al. in US 20130218438. Therein, water usage for dilution control relative to knock control is adjusted based on combustion stability limits. Another example approach is shown by Leone et al. in US 20140202434. Therein water injection is used when the engine load is higher than a threshold or the engine is knock limited.

The inventors herein have recognized that the maximum fuel economy benefits of water usage may be limited by the availability of water on-board the vehicle. In particular, the water supply may be limited based on how much water can be generated on-board the vehicle via-a-vis how much water is required for knock control, dilution control, catalyst temperature control, etc. As an example, if water injection is enabled for catalyst temperature control, due to the high water consumption rate during catalyst temperature control, there may be insufficient water available for knock control. As a result, spark may need to be retarded for knock control. The fuel penalty associated with the use of spark retard may offset or even outweigh the fuel economy benefit associated with water usage for catalyst temperature control.

In one example, the above issues may be addressed by a method for an engine comprising: comparing a current water level in a water reservoir and a predicted water level in the reservoir over a vehicle drive to a plurality of threshold water levels; and injecting water from the reservoir into the engine responsive to each of engine knock, dilution demand, and exhaust temperature based on the comparison. In this way, water usage may be prioritized if water availability is limited.

As an example, an engine may be configured with a water injection system that enables water to be injected into one or more engine locations, such as into an intake manifold, into an intake port, or directly into an engine cylinder. The water injection system may include one or more water injectors coupled to the different locations, as well as a water reservoir supplying water to the injector(s). The water reservoir may be manually refilled by a vehicle operator. Additionally, the water reservoir may be coupled to a water collection system that opportunistically refills the reservoir with water generated on-board the vehicle. For example, water in the form of condensate may be retrieved from one or more vehicle components, such as an EGR cooler, an AC evaporator, an exhaust heat exchanger, a charge air cooler, a vehicle external surface, etc. An engine controller may assess engine operating conditions and determine respective amounts (and locations) of water to inject into the engine for each of knock control, exhaust temperature control, as well as to meet engine dilution demand. The controller may also retrieve a current water level in the water reservoir and predict an expected water level in the reservoir over a vehicle drive cycle based on current and predicted rates of water generation as well as current and predicted rates of water usage (e.g., for knock, dilution, and exhaust temperature control). Based on the current water level and the predicted water levels over the drive cycle, the controller may assign a priority value to each of the respective uses of water, and determine the amounts to be injected for knock control, exhaust temperature control, as well as to meet engine dilution demand. In addition, based on the current water level and the predicted water level (as well as the trend for water availability from the current water level to the predicted water level), the controller may determine a plurality of water level thresholds, and compare the amounts to be injected to those water level thresholds. The selected amount for the current operating conditions may then be injected based on the comparing. As one example, when the water level is already low and/or is predicted to fall over the drive cycle, the water injection amount for knock control may be given highest priority and sufficient water may be injected to ensure good knock control, but no water may be injected for exhaust temperature control or for dilution demand. The prioritization is used in order to achieve the highest engine efficiency benefit per unit of water, when the water supply is limited. If water injection is not used for meeting the dilution demand, then the opening of an EGR valve may be adjusted based on the selected water injection amount to meet the dilution demand. Likewise, if the water level is currently very low and not predicted to rise, and water injection is not used for knock control, then spark timing may be retarded based on the selected water injection amount for knock control. In still further examples, the water level threshold required for enabling water injection for dilution control may be lowered when the predicted water level increases from the current water level, and raised when the predicted water level decreases from the current water level. As a result, water usage for dilution control can be limited when water availability is expected to drop.

In this way, the fuel economy benefit of water injection can be maximized, particularly when operating with a limited water supply. By assigning a priority value to water injection amounts applied for distinct engine operating conditions, and injecting the water amount based on the highest priority value when the water supply is limited, the efficiency benefit per unit of water injected can be substantially increased. By stopping or reducing the injection of water during operating conditions having a lower efficiency benefit, engine performance can be maintained elevated until the water reservoir becomes empty. By also varying the selection of the water injection amount based on the estimated quality of water refilled into the water reservoir, water usage benefits can be extended over a wider range of engine operating conditions, even when the water supply is of poor quality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for leveraging the benefits of injecting water into an engine from a water injection system coupled to a vehicle engine, as described with reference to the vehicle system of FIG. 1. A controller may be configured to perform a control routine, such as the example routine of FIG. 2, to assign priority values to distinct water injection amounts for knock control, dilution control, and exhaust temperature control based on water availability, and then select the injection amount with the highest priority value for delivery. The controller may also be configured to perform a control routine, such as the example routine of FIG. 3, to vary an order of water injection for knock control, dilution control, and exhaust temperature control, based on water availability. An example water injection adjustment is described with reference to FIG. 4. In this way, the fuel economy benefits of water injection can be leveraged even when the water supply is limited.

Figure 1:
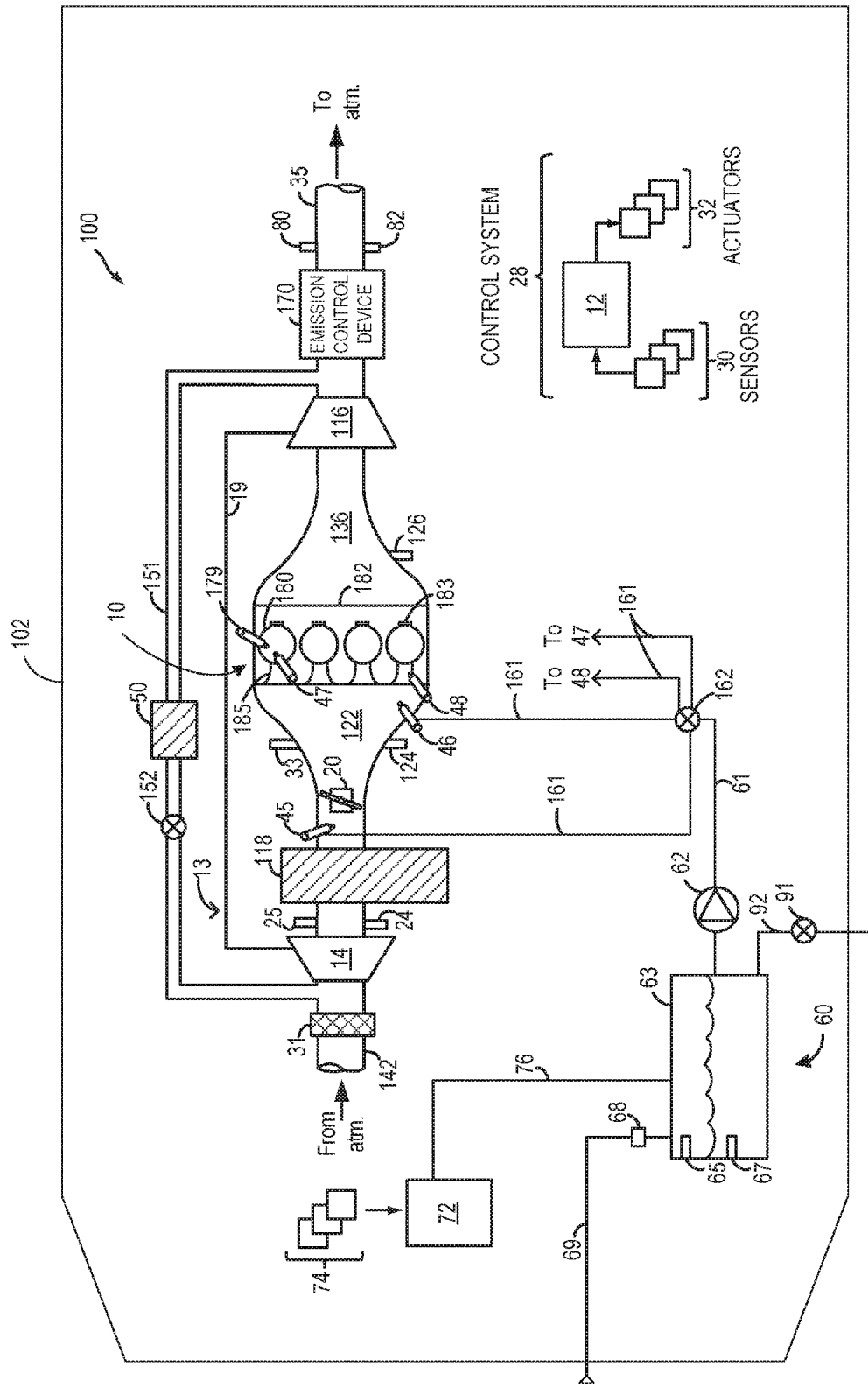
FIG. 1 shows a schematic diagram of an engine system including a water injection system.

FIG. 1 shows an example embodiment of an engine system 100 configured with a water injection system 60. Engine system 100 is coupled in motor vehicle 102, illustrated schematically. Engine system 100 includes an engine 10, depicted herein as a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 118 to throttle valve (e.g., intake throttle) 20. The CAC may be an air-to-air or air-to-coolant heat exchanger, for example. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 1, the pressure of the air charge within the intake manifold is sensed by manifold absolute pressure (MAP) sensor 124 and a boost pressure is sensed by boost pressure sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 122 is coupled to a series of combustion chambers or cylinders 180 through a series of intake valves (not shown) and intake runners (e.g., intake ports) 185. As shown in FIG. 1, the intake manifold 122 is arranged upstream of all combustion chambers 180 of engine 10. Additional sensors, such as manifold charge temperature (MCT) sensor 23 and air charge temperature sensor (ACT) 25 may be included to determine the temperature of intake air at the respective locations in the intake passage. The air temperature may be further used in conjunction with an engine coolant temperature to compute the amount of fuel that is delivered to the engine, for example. Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 23 may be positioned to determine the manifold charge temperature, and may include air and exhaust recirculated through the EGR passage 151.

Combustion chamber 180 also receives water and/or water vapor via water injection system 60. Water from water injection system 60 may be injected into the engine intake or directly into the combustion chambers 180 by one or more of water injectors 45-48. As one example, water may be injected into intake manifold 122, upstream of throttle 20, via water injector 45, herein also referred to as central water injection. As another example, water may be injected into intake manifold 122, downstream of the throttle in one or more locations, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection). In one embodiment, injector 48 arranged in the intake runners may be angled toward and facing the intake valve of the cylinder which the intake runner is attached to. As a result, injector 48 may inject water directly onto the intake valve, resulting in faster evaporation of the injected water and a higher dilution benefit from the water vapor. In another embodiment, injector 48 may be angled away from the intake valve and arranged to inject water against the intake air flow direction through the intake runner. As a result, more of the injected water may be entrained into the air stream, thereby increasing the charge cooling benefit of the water injection.

Though only one representative injector 47 and injector 48 are shown in FIG. 1, each of combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber).

Water may be injected into the engine responsive to various engine operating conditions. As one example, water may be injected (e.g., directly into the cylinder) responsive to an indication of engine knock. By using water injection for knock control, the need for spark retard is reduced, providing fuel economy benefits. As another example, water may be injected (e.g., into the engine intake manifold) responsive to a demand for engine dilution. By using water injection for dilution, the need for EGR is reduced, providing combustion stability and transient control benefits. As yet another example, water may be injected (e.g., into the intake or exhaust manifold) responsive to an indication of exhaust over-heating. By using water injection for exhaust temperature control, the need for fuel enrichment is reduced, providing fuel economy and exhaust emissions benefits. As elaborated with reference to the routines of FIGS. 2-3, an amount of water injected for knock, dilution, and exhaust temperature control may be adjusted based on current and predicted water availability in a water reservoir. In addition, a prioritization of water injection responsive to each of knock, dilution, and exhaust temperature control may be adjusted.

Water injection system 60 may include a water storage tank 63, a water lift pump 62, a collection system 72, and a water filling passage 69. Water stored in water tank 63 is delivered to water injectors 45-48 via water passage 61 and conduits or lines 161. In embodiments that include multiple injectors, water passage 61 may contain a valve 162 (e.g., diverter valve, multi-way valve, proportioning valve, etc.) to direct water to the different water injectors via the corresponding conduits. Alternatively, each conduit (or water line) 161 may include respective valves within the water injectors 45-48, for adjusting water flow there-through. In addition to water lift pump 62, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water tank 63 is higher than a threshold level, it may be inferred that there is sufficient water available for injection, and accordingly water injection may be enabled by the controller. Else, if the level of water in the water tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system and/or exhaust system to collect water condensed from exhaust passing through the system. In another example, collection system 72 may be coupled with an air conditioning system (not shown) for collected water condensed from air passing through an evaporator. In yet another example, collection system 72 may be coupled with an external vehicle surface to collect rain or atmospheric condensation. Manual filling passage 69 may be fluidically coupled to a filter 68, which may remove some impurities contained in the water. A drain 92 including a drain valve 91 may be used to drain water from the water storage tank 63 to a location outside the vehicle (e.g., onto the road), such as when a quality of the water is deemed to be lower than a threshold and not suitable for injection into the engine (e.g., due to high conductivity, high particulate matter content). In one example, the quality of the water may be assessed based on the output of conductivity sensor 93 coupled to water injection system 60, in water line 61. In other examples, sensor 93 may be a capacitance sensor, optical sensor, turbidity sensor, density sensor, or some other type of water quality sensor.

FIG. 1 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIG. 1, to receive input including transmission gear position, accelerator pedal position, brake demand, vehicle speed, engine speed, mass airflow through the engine, boost pressure, ambient conditions (temperature, pressure, humidity), etc. Other sensors include CAC 118 sensors, such as CAC inlet air temperature, ACT sensor 125, exhaust pressure and temperature sensors 80, 82, and pressure sensor 124, CAC outlet air temperature sensor, and MCT sensor 23, knock sensor 183 for determining ignition of end gases and/or water distribution among cylinders, and others. The controller 12 receives signals from the various sensors of FIG. 1 and employs the various actuators of FIG. 1 to adjust engine operation based on the received signals and instructions stored on a memory of the controller. For example, injecting water to the engine may include adjusting a pulse-width of injectors 45-48 to vary an amount of water injected while also adjusting a timing of the water injection and a number of injection pulses. In some examples, the storage medium may be programmed with computer readable data representing instructions executable by the processor for performing the methods described below (e.g., at FIGS. 2-3) as well as other variants that are anticipated but not specifically listed.

In this way, the components of FIG. 1 enable a vehicle system comprising: an engine including an intake manifold and an exhaust manifold; an exhaust catalyst coupled to the exhaust manifold; an EGR passage including an EGR valve for recirculating exhaust gas from the exhaust manifold to the intake manifold; a water injection system including a water reservoir, a water injector, and a water collection system; a water level sensor coupled to the water reservoir; a knock sensor coupled to the engine; and a controller. The controller may be configured with computer readable instructions stored on non-transitory memory for: comparing a current water level in the reservoir to a predicted water level after a duration of vehicle operation; determining respective amounts of water to inject into the engine responsive to each of knock, dilution demand, and exhaust temperature; selecting an amount of water to inject from among the respective amounts based on the comparing; delivering the selected amount of water via the water injector; and adjusting an opening of the EGR valve based on the dilution demand relative to the selected amount of water.

Figure 2:
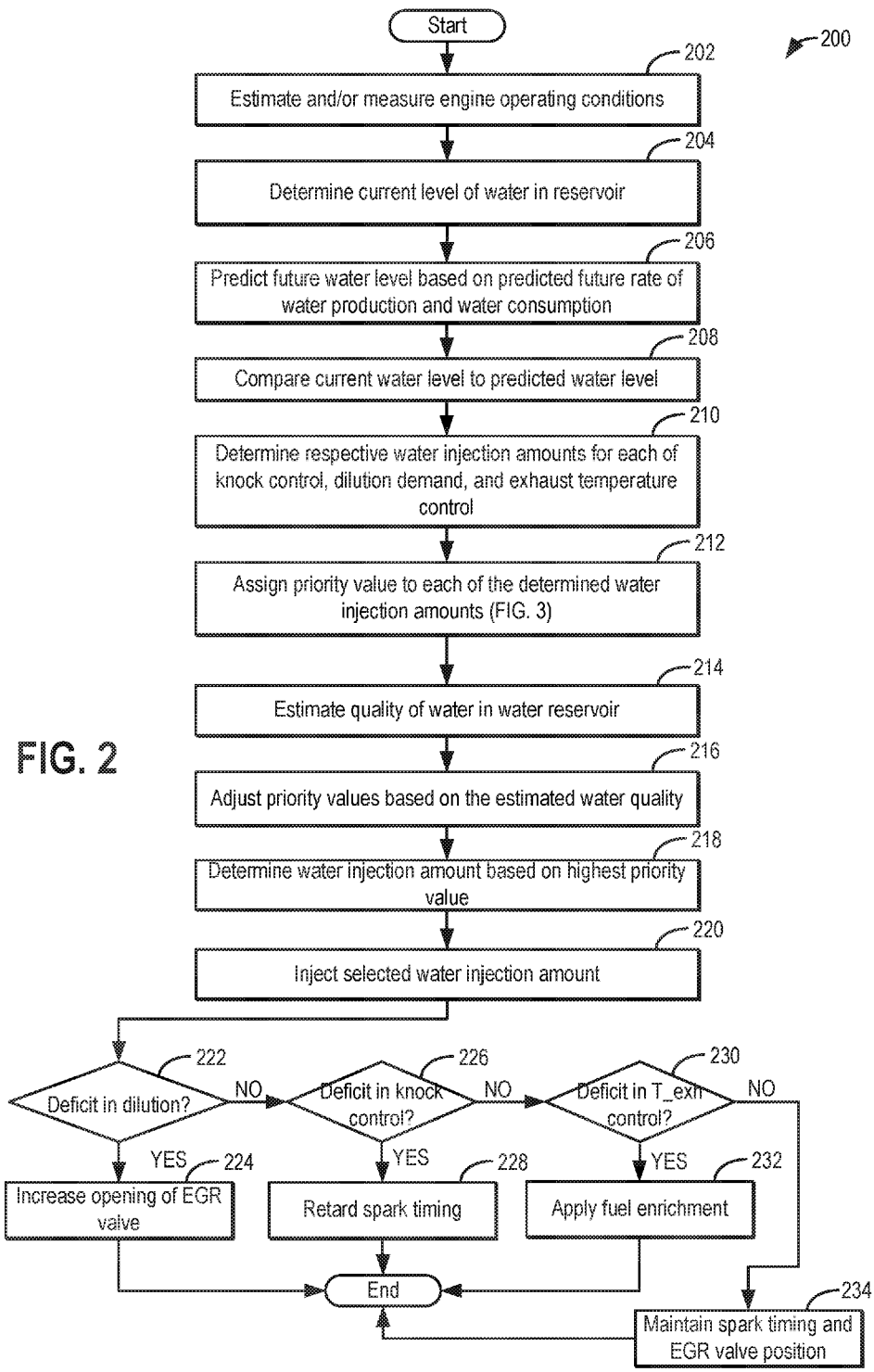
FIG. 2 shows a high level flow chart for varying water usage from the water injection system of FIG. 1 based on current and predicted water levels.

Turning now to FIG. 2, an example method 200 is shown for adjusting water injection into an engine, from a water injection system, responsive to various engine operating conditions based on each of a current water usage rate and a predicted water usage rate. The method enables engine performance to be improved by optimizing water usage when water level is already low, or when water availability is predicted to be limited during the foreseeable driving cycle. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring engine operating conditions. These may include, for example, engine speed and load, driver torque demand, ambient conditions (ambient temperature and humidity, barometric pressure, etc.), boost pressure, MAP, MAF, engine temperature, catalyst temperature, etc.

At 204, the method includes determining the current level of water in a water reservoir (or water tank) of the water injection system. The current level of water may be directly measured by a fluid level sensor, or it may be estimated based on a history of water production, water consumption, and tank refilling.

In one example, the engine is coupled in a vehicle and water in the water reservoir is refilled on-board the vehicle via a collection system collecting condensate from one or more engine components such as an EGR cooler, a charge air cooler, an AC condenser, and a vehicle external surface. Water may also be refilled manually into the reservoir by a vehicle operator from a water source off-board the vehicle.

At 206, the method includes predicting a future (or expected) level of water in the water reservoir of the water injection system during the foreseeable driving cycle. The foreseeable driving cycle may be defined based on destination information from a navigation system (e.g., GPS) of the vehicle, and/or based on previous vehicle driving history (e.g. typical driving routes, speeds, acceleration rates, power demands, etc.). The predicted level of water may be determined as a function of the initial water level in the water reservoir at the beginning of the vehicle drive cycle, and further based on a predicted rate of water generation on-board the vehicle relative to a predicted rate of water usage or consumption on-board the vehicle.

In one example, the predicted rate of water production may be determined as a function of the running average of the collection rate of AC condensate over a last threshold number of miles (or minutes) of vehicle operation, as well as predicted cabin cooling demand. Likewise, the predicted rate of water production may be determined as a function of the running average of the collection rate of exhaust condensate and/or vehicle surface condensate over the last threshold number of miles (or minutes) of vehicle operation. The predicted rate of AC condensate collection (and predicted cabin cooling demand) and vehicle surface condensate collection may be further determined as a function of predicted ambient conditions. For example, expected ambient temperature and humidity may affect the collection rate of AC condensate and vehicle surface condensate (specifically, both collection rates may be predicted to increase as the ambient humidity increases). The predicted rate of exhaust condensate collection may be further determined as a function of predicted EGR usage over the drive cycle.

The predicted rate of water production may also be determined as a function of the expected ambient conditions along the predicted travel route, based on route and destination information from a navigation system (e.g., GPS) of the vehicle. The route and destination information may include, for example, internet based or broadcast weather forecasts (e.g., prediction of rain, snow, dry weather, etc.), predicted ambient temperature and humidity (which may affect predicted cabin cooling demand), terrain information for the travel route selected by the operator (e.g., expected terrain conditions, presence of uphill and downhill segments, expected road grade, etc.), as well as knowledge of typical driving patterns of the operator (that is, operator drive history which may include driver performance preferences).

The predicted water level may also be determined as a function of the predicted date, time, and rate of water tank refilling by the driver. This may be based on the previous history of water tank refilling by location (e.g., GPS coordinates of refill location in relation to predicted travel route) as well as fuel tank level and day of week, day of month, or time of day details. As an example, the operator may have a history of refilling the water tank once a week (e.g., every Sunday), or refilling the water tank when stopping at a gas station to refill the fuel tank, etc. These manual refills may affect the water level in the tank.

The predicted rate of water consumption may be determined as a function of the running average of water usage (or drop in water level from the water reservoir) over the last threshold number of miles (or minutes) of vehicle operation. As elaborated herein, water may have been injected during engine operation for one or more of addressing cylinder knock, providing a desired amount of engine dilution, and exhaust temperature control. The predicted rate of water usage on-board the vehicle may also be determined as function of ambient conditions including ambient temperature and humidity, the travel route selected by the operator (e.g., speed limits for different segments of the selected route, expected terrain conditions, location and number of uphill and downhill segments, road grade, frequency of acceleration versus steady cruise over the different segments, etc.) as well as operator drive history (e.g., whether the operator typically drives the vehicle in a performance mode, a fuel economy mode, or a sport mode, whether the operator is lead footed, whether the operator typically applies the brakes frequently, whether the operator tends to use cruise control or accelerates/decelerates frequently, etc.). The predicted rate of water consumption may be further determined as a function of typical previous driver aggressiveness (e.g., brake and accelerator usage patterns). As such, each of these parameters affects the speed-load regions the engine is predicted to operate in, which in turn affects expected knock frequency, expected EGR usage, and expected engine and exhaust temperatures.

At 208, optionally, the current water level may be compared to the predicted water level. As an example, a difference between the current water level and the predicted water level may be determined. As another example, a rate of change in the water level (from the current level to the predicted level) over a duration or distance of vehicle operation over the foreseeable vehicle drive cycle may be determined. For example, it may be determined if the predicted water level is trending towards a decrease or increase from the current water level.

At 210, the method includes determining respective amounts of water to inject into the engine responsive to each of engine knock, engine dilution demand, and exhaust temperature. As discussed earlier, water may be injected into the engine responsive to knock wherein the charge cooling from the water provides knock relief, thereby reducing the reliance on spark retard for knock control. Likewise, water may be injected into the engine to provide a desired engine dilution, reducing the need for EGR. Further, water may be injected into the engine responsive to elevated exhaust temperatures wherein the charge cooling from the water enables exhaust temperature control, reducing the need for enrichment of the air/fuel ratio. In one example, the controller may determine a first amount of water to inject into the engine responsive to knock, a second amount of water to inject into the engine responsive to exhaust temperature, and a third amount of water to inject into the engine responsive to dilution demand. The first, second, and third amounts may be distinct amounts. In addition to determining the amount of water injection, the controller may further determine a location of the water injection. As such, the water injection system may be configured with one or more water injectors for injecting water directly into the engine cylinder, into an intake port, and/or into an intake manifold (upstream or downstream of an intake throttle).

Figure 3:
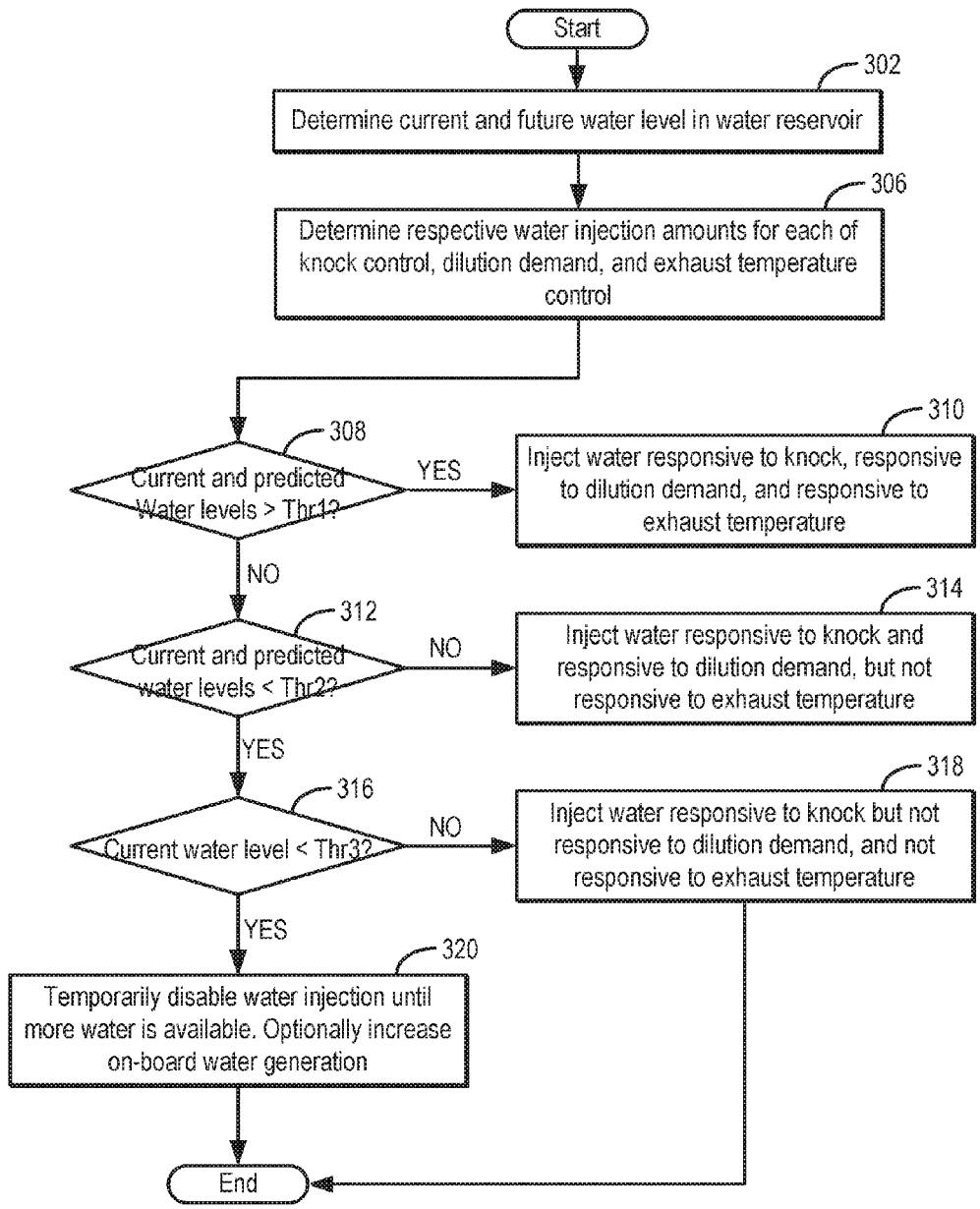
FIG. 3 shows a high level flow chart for assigning priority values to distinct water injection amounts for addressing each of engine knock, dilution demand, and exhaust temperature.

At 212, the method includes assigning a priority value to each of the determined water injection amounts based on the current water level and the predicted water level, for example as elaborated according to the procedure of FIG. 3. The assigned priority values may be determined based on a predicted future water supply. A first set of priority values may be assigned when the predicted water level is determined to be higher than the current water level, indicating that water is currently limited but more water is expected to be available in the future part of the drive cycle (or over the next several drive cycles). A second, different set of priority values may be assigned when the current water level is determined to be higher than the predicted water level, indicating that water is currently amply available but water availability is expected to become limited in the future part of the drive cycle (or water may run out in the next several drive cycles). As elaborated herein, the assigning of priority values enables the fuel economy benefit of the limited water supply to be maximized by using the water during conditions that create a higher efficiency benefit per unit of water while stopping or reducing water usage during conditions that create a lower efficiency benefit per unit of water. The different priority values may affect the order in which the different amounts of water are injected into the engine.

In one example, assigning priority values includes, when the current water level is higher than the predicted water level, assigning a first, highest priority value to the first amount of water to be injected responsive to knock, followed by a second, lower priority value to the second amount of water to be injected responsive to exhaust temperature, followed by a third, lowest priority value to the third amount of water to be injected responsive to dilution demand. This is due to the relatively higher water consumption rate when water is used for exhaust temperature control. As another example, assigning priority values includes, when the predicted water level is higher than the current water level, assigning a first, highest priority value to the first amount of water to be injected responsive to knock, followed by a second, lower priority value to the third amount of water to be injected responsive to dilution demand followed by a third, lowest priority value to the second amount of water to be injected responsive to exhaust temperature.

Assigning priority values may additionally or alternatively include adjusting water level thresholds responsive to which water is injected for knock control, dilution control, and temperature control. As one example, water may be injected for each of knock control, dilution control, and temperature control when the water level in the water reservoir is above a first threshold. Water may be injected for each of knock control and temperature control but not dilution control when the water level in the water reservoir is above a second threshold, lower than the first threshold. Water may be injected for only knock control and not for temperature control or dilution control when the water level in the water reservoir is above a third threshold, lower than each of the first and second threshold. As the current water level changes with respect to the predicted water level, the thresholds may be adjusted. For example, the second and third thresholds may be adjusted with reference to the first threshold. As an example, as the predicted water level drops relative to the current water level, a water shortage may be anticipated. To conserve water primarily for knock control, while maintaining the first threshold (or lowering the first threshold), one or more of the second and third thresholds may be raised. A rate of raising the second and/or third threshold may be based on the rate of change in water level from the current level to the predicted level. For example, when the predicted water level is expected to drop relative to the current water level at a faster rate (faster rate of depletion), the rate of increasing the second and third thresholds may also correspondingly increase. Further, based on the expected change in exhaust temperature, an amount of temperature control relative to dilution control may be predicted and the rate of raising the second threshold relative to the third threshold may be varied. For example, the third threshold may be raised at a faster rate than the second threshold so that dilution control is assigned the lowest priority.

As another example, as the predicted water level rises relative to the current water level, a water surplus may be anticipated. To enhance water usage, while maintaining the first threshold (or lowering the first threshold), one or more of the second and third thresholds may be lowered. A rate of lowering the second and/or third threshold may be based on the rate of change in water level from the current level to the predicted level. For example, when the predicted water level is expected to rise relative to the current water level at a faster rate (faster rate of regeneration), the rate of decreasing the second and third thresholds may also correspondingly increase. Further, based on the expected change in exhaust temperature, an amount of temperature control relative to dilution control may be predicted and the rate of lowering the second threshold relative to the third threshold may be varied. For example, the second threshold may be lowered at a faster rate than the third threshold so that temperature control is assigned a higher priority earlier.

At 214, the method includes estimating the quality of water in the water reservoir. As such, the nature of contaminants present in the water, as well as the degree of contamination may vary widely based on when: the vehicle: operator refilled the water tank from, ambient conditions (e.g., ambient dust levels), as well as based on a percentage of the total water in the reservoir that was generated on-board the vehicle relative to the percentage of water in the reservoir sourced off-board the vehicle. As an example, it may be recommended to refill the water tank with distilled water, but the operator may refill with tap water or well water instead. As such the different sources of water may contain different types and amounts of minerals and other contaminants that, when injected, may cause deposits on water filters, water injectors, engine components, exhaust catalysts, etc. The catalysts could also become chemically contaminated. In one example, the quality of the water in the water reservoir may be estimated based on the output of a water quality sensor coupled to the water reservoir, the water quality estimate based on a conductivity value or ionic strength of the water (such as sensed via a conductivity sensor). In alternate examples, the quality of the water may be estimated based on an ionic strength of the water, a particle matter content, a turbidity sensor, a density sensor, a refraction index, etc.

In still other examples, the water quality may be inferred based on the water refilling location using knowledge of the vehicle's location (such as based on GPS data, location of nearby WiFi hotspots, etc.) combined with knowledge of the local water quality at that location (such as determined on-board or retrieved from a database, such as an internet database of water quality for city water systems and ground water). If the water quality value was inferred or retrieved from a remote location, the controller may additionally refine the data with previous history of contamination detected after refilling at the same location. The history may be based on data collected on-board the given vehicle, or collected on-board an alternate vehicle and retrieved through vehicle-to-vehicle (V2V) or vehicle-to-infrastructure communication. In one example, the quality of the water may be given an index value, or a rating number. In still further examples, the quality of water at the next refill event may be predicted.

At 216, the method includes further adjusting the assigned priority values based on the estimated quality of water in the reservoir. This may include determining whether to enable or disable water injection, as well as adjusting the water injection priority values based on the estimated water quality. As an example, the estimated water quality (e.g., the index value or rating number or conductivity value) may be compared to a threshold which depends on the water quality sensor being used. For example, a lower reading on a turbidity sensor may be given a high water quality index value, and turbidity readings of less than 5 NTU may correspond to water quality index values higher than the threshold. The threshold may correspond to a minimum water quality level required to enable water injection into the engine without compromising engine performance or combustion characteristics. In some examples, a common threshold may be applied for all water injection events. In other examples, distinct thresholds may be applied for water injection responsive to knock as compared to water injection responsive to dilution demand or exhaust temperature control, because deposit forming tendency may depend on component temperatures or other factors which are highly correlated to each of these three usage conditions. In some examples, the estimated water quality may be compared to each of a lower threshold below which water injection may always be disabled, and an upper threshold above which water injection may always be enabled. In between the upper and lower threshold, water injection may be limited, for example, an operating window where water injection is permissible may be limited or varied, which may affect the assigned priority value of water injection. For example, when the water quality is lower, water injection responsive to dilution demand may be enabled in engine speed-load regions where water injection responsive to dilution demand is not enabled when the water quality is higher. As a result, amounts of water to be injected responsive to dilution demand may be given a higher priority value when the water quality is lower as compared to when the water quality is higher, in order to use the water when it will not cause deposit problems and make room in the tank for a refill with higher-quality water. As with the thresholds, distinct operating windows may be applied for water injection responsive to knock as compared to water injection responsive to dilution demand or exhaust temperature control.

At 218, the method includes determining water injection amounts for each of knock control, dilution demand, and exhaust temperature control. Based on the current water level and the predicted water levels over the drive cycle, the controller may assign a priority value to each of the respective uses of water, and determine the amounts to be used for knock control, exhaust temperature control, as well as to meet engine dilution demand. The selected total amount may then be injected. As one example, when the current water level is low and/or the water level is medium but predicted to fall to low over the drive cycle, the water injection amount for knock control may be given the highest priority value and sufficient water may be injected to ensure knock control in order to achieve the highest engine efficiency benefit per unit of water. In this case insufficient water may be available for meeting the dilution demand, and the opening of an EGR valve may be adjusted based on the selected water injection amount to meet the dilution demand. In another case, if the current and predicted water level is very low and the water injected for knock control is insufficient, then spark timing may be retarded based on the selected water injection amount for knock control. As a third example, when the current water level is medium and/or the water level is predicted to rise from a low to medium level over the drive cycle, the water injection amounts for knock control and dilution demand may both be given high priority and sufficient water may be injected to ensure knock control and to achieve dilution demand in order to achieve the highest engine efficiency benefit per unit of water. In this case dilution demand may be met with water injection so little or no EGR may be used, but insufficient water may be available for exhaust temperature control, and air/fuel ratio may be adjusted to achieve exhaust temperature control. As a fourth example, when the current water level is high and/or the water level is predicted to rise from a medium to high level over the drive cycle, the water injection amounts for knock control and dilution demand and exhaust temperature control may all be given high priority and sufficient water may be injected to ensure knock control and to achieve dilution demand and to achieve exhaust temperature control in order to achieve the highest engine efficiency benefit per unit of water. In this case dilution demand may be met with water injection so little or no EGR may be used, and exhaust temperature control may be achieved with water injection, so little or no air/fuel enrichment may be needed to achieve exhaust temperature control.

In this way, the fuel economy benefit of water injection can be maximized, particularly when operating with a limited water supply. By assigning a priority value to water injection amounts applied for distinct engine operating conditions, and injecting an amount of water for each usage condition based on its priority value when the water supply is limited, the efficiency benefit per unit of water injected can be substantially increased. By stopping or reducing the injection of water during operating conditions having a lower efficiency benefit, engine performance can be maintained elevated until the water reservoir becomes empty. By also varying the selection of the water injection amount based on the estimated quality of water refilled into the water reservoir, water usage benefits can be extended over a wider range of engine operating conditions, even when the water supply is of poor quality.

In one example, the controller may determine a control signal to send to the water injector actuator, such as a pulse width of the signal. The pulse width may be determined based on the selection of one amount among the respective water injection amounts, the selection based on the comparison of the current water level relative to the predicted water level. The controller may determine the pulse width through a determination that directly takes into account a difference between the predicted level and the current level of water in the tank, such as by increasing the pulse width as the predicted level of water increases. The controller may alternatively determine the pulse width based on a calculation using a look-up table.

At 220, the method includes injecting the selected amount of water, the water injected from the reservoir into the engine responsive to each of engine knock, dilution demand, and exhaust temperature control. The selected amount of water is injected into a water injection location selected based on the highest assigned priority value. Injecting the water into the engine includes one or more of port injecting the water into an intake port of an engine cylinder, upstream of an intake valve, via a port water injector, direct injecting water into the engine cylinder, via a direct water injector, and central injecting water into an engine intake manifold, upstream or downstream of an intake throttle, via a central water injector. Based on the selected location, and the selected amount, the corresponding injector may be actuated. For example, the controller may send a pulse-width signal to the corresponding water injector to deliver the selected amount of water into the selected location while maintaining the remaining water injectors disabled. In one example, when the first amount of water is selected, the controller may actuate the direct water injector and send a pulse-width signal corresponding to the first amount to the direct water injector so as to deliver the selected amount of water directly into the engine cylinder for knock relief.

Injecting the selected amount of water may include adjusting the rate of water injection rate to be a percent of the fuel flow rare. In other examples, water injection may be controlled in an on/off manner. Therein, either water injection is enabled (responsive to knock or dilution demand or exhaust temperature) or it is disabled.

By adjusting the selection of the water injection amounts, an order of water injection for engine control may be varied. In some examples, the selection of the water injection amounts and adjusting of the order of water injection may be adjusted based only on the current water level relative to one or more thresholds. In other examples, the selection of the water injection amounts and adjusting of the order of water injection may be adjusted based on the current water level and the predicted water level over the foreseeable drive cycle relative to one or more thresholds.

At 222, after injecting the selected amount of water, the method includes determining if there is a deficit in the provided dilution relative to the dilution demand. In one example, there may be a dilution deficit responsive to the limiting or discontinuing of water injection to satisfy the dilution demand. This may occur when the actual or predicted amount of water is too low to allow full usage of water injection for dilution control. If there is a dilution deficit, then at 224, a degree of opening of an EGR valve may be adjusted responsive to the selecting. For example, the controller may send a signal to an EGR valve actuator to actuate the EGR valve to a position where the EGR valve is open to a greater degree when there is a dilution deficit. As a result, recirculation of exhaust gas from the engine exhaust to the engine intake is increased. Else, the controller may send a signal to the EGR valve actuator to actuate the EGR valve to an alternate position where the EGR valve is open to a smaller degree when there is not a dilution deficit. As a result, recirculation of exhaust gas from the engine exhaust to the engine intake is decreased. The change in EGR flow may be determined as a function of the dilution deficit, the EGR flow rate increased as the dilution deficit increases. In this way, at least a portion of the dilution demand may be provided by the water injection while the remainder of the dilution demand is provided via EGR flow. The routine then ends. By using water injection for meeting a larger portion of the dilution demand when sufficient water is available, combustion stability and transient control issues associated with EGR usage can be reduced.

If there is no dilution deficit, then at 226, it may be determined if there is a deficit in knock control. In one example, there may be a knock control deficit responsive to the limiting or discontinuing of water injection for knock control. This may occur when the actual or predicted amount of water is too low to allow full use of water for knock control. Knock control deficit may be determined if engine knock continues to occur even after the selected amount of water is injected. If there is a knock control deficit, then at 228, the method include operating the engine with spark timing retarded from MBT (or an alternate nominal value). The amount of spark retard applied may be determined as a function of the knock control deficit, the amount of spark retard increased as the knock frequency after water injection increases. In this way, at least a portion of the knock mitigation may be provided by the water injection while the remainder of the knock mitigation is provided via spark retard. The routine then ends. By using water injection for meeting a larger portion of the knock mitigation when sufficient water is available, spark retard usage can be reduced, improving fuel economy.

If there is no knock control deficit, then at 230, it may be determined if there is a deficit in exhaust temperature control. In one example, there may be an exhaust temperature control deficit responsive to the limiting or discontinuing of water injection for exhaust temperature control. This may occur when the actual or predicted amount of water is too low to allow full use of water for exhaust temperature control. Exhaust temperature control deficit may be determined if the estimated exhaust temperature continues to remain elevated even after the selected amount of water is injected. If there is an exhaust temperature control deficit, then at 232, the method include operating the engine with fuel enrichment. That is, the engine may be operated richer than stoichiometry. The degree of richness applied may be determined as a function of the exhaust temperature control deficit, the degree of richness increased as the estimated exhaust temperature remains elevated after the water injection. In this way, at least a portion of the exhaust temperature control may be provided by the water injection while the remainder of the exhaust temperature control is provided via enrichment. The routine then ends. By using water injection for meeting a larger portion of the exhaust temperature control when sufficient water is available, fuel enrichment usage can be reduced, improving fuel economy and exhaust emissions.

If there is no exhaust temperature control deficit, then at 234, the method includes maintaining spark timing and EGR valve position. In this way, engine performance, fuel economy, and emissions over the foreseeable drive cycle can be optimized based on whether the current or the future water availability is limited.

Turning now to FIG. 3, another example method 300 for adjusting water usage based on current and predicted water levels in a water injection system is shown. Herein, a prioritization of water usage for knock relief, dilution control, and exhaust temperature control is adjusted based on an expected water level in the reservoir.

At 302, current and future water levels in the water reservoir are determined. As previously elaborated at FIG. 2 (at 204-206), the future water levels may be predicted as a function of current and predicted engine operating conditions, current and predicted ambient conditions, navigational input, operator drive history, etc. In some examples, a net water level in the reservoir may be determined based on a comparison of the current water level to the predicted water level.

At 306, as at 210, the method includes determining respective amounts of water to inject into the engine responsive to each of engine knock, engine dilution demand, and exhaust temperature. The controller may determine a first amount of water to inject into the engine responsive to knock, a second amount of water to inject into the engine responsive to exhaust temperature, and a third amount of water to inject into the engine responsive to dilution demand. The first, second, and third amounts may be distinct amounts. In addition to determining the amount of water injection, the controller may further determine a location of the water injection (e.g., direct, central, or port). The first, second, and third amounts of water may be injected into distinct locations of the engine. At 308, it may be determined if the current water level and the predicted water level over the foreseeable drive cycle is higher than a first threshold. If yes, then at 310, in response to water level in the water reservoir coupled to a water injector being higher than the first threshold, the method includes injecting the first amount of water responsive to knock, and the second amount of water responsive to exhaust temperature, and the third amount of water responsive to engine dilution demand. That is, water is used generously at 310 if both the current and the predicted water levels are higher than the first threshold.

If the water level is not higher than the first threshold, at 312, it may be determined if the current water level and the predicted water level over the foreseeable drive cycle is lower than a second threshold, the second threshold lower than the first threshold. If not, then in response to the current and predicted water levels being higher than the second threshold and lower than the first threshold, at 314, the method includes injecting the first amount of water responsive to knock, and the second amount of water responsive to exhaust temperature, but not injecting the third amount of water responsive to engine dilution demand. This allows for moderate usage of water.

If the current and predicted water level is lower than the second threshold, at 316, it may be determined if the current water level over the foreseeable drive cycle is lower than a third threshold, lower than each of the first and second threshold. If not, then at 318, in response to the current water level being higher than the third threshold but lower than each of the first and second threshold, the method includes injecting only the first amount of water responsive to knock, but not the second amount of water responsive to exhaust temperature or the third amount of water responsive to engine dilution demand. This allows for cautious water usage when both the current and predicted water levels are below the second threshold.

If the current water level (regardless of the predicted water level) is lower than the third threshold, then at 320, water injection may be temporarily disabled until more water is available, such as after the water reservoir has been manually refilled. Optionally, the vehicle operator may be provided an indication that water refilling is required. Furthermore, on-board water generation may be actively increased. This allows water injection to be disabled responsive to very low current water levels, and not based on predicted low water levels (for example, independent of predicted water levels).

It will be appreciated that while the above method compares the current and predicted water levels to the first and second thresholds, while comparing only the current water level to the third threshold, this is not meant to be limiting. As such, in alternate implementations, a different combination of the current and predicted water levels may be applied with a different set of logic. For example, in alternate implementations, only the current water level or only the predicted water level may be compared to the different thresholds. Further, a different combination of the current and predicted water levels may be compared to the first, second, and third thresholds.

It will be appreciated that the thresholds may be dynamic thresholds whose values are varied based on trends in the current water level and the predicted water level. For example, the second and third thresholds may be adjusted with reference to the first threshold while maintaining the first threshold. As an example, as the predicted water level drops relative to the current water level, a water shortage may be anticipated. To conserve water primarily for knock control, while maintaining the first threshold (or lowering the first threshold), one or more of the second and third thresholds may be raised. A rate of raising the second and/or third threshold may be based on the rate of change in water level from the current level to the predicted level. For example, when the predicted water level is expected to drop relative to the current water level at a faster rate (faster rate of depletion), the rate of increasing the second and third thresholds may also correspondingly increase. Further, based on the expected change in exhaust temperature, an amount of temperature control relative to dilution control may be predicted and the rate of raising the second threshold relative to the third threshold may be varied. For example, the third threshold may be raised at a faster rate than the second threshold so that dilution control is assigned the lowest priority.

As another example, as the predicted water level rises relative to the current water level, a water surplus may be anticipated. To enhance water usage, while maintaining the first threshold (or lowering the first threshold), one or more of the second and third thresholds may be lowered. A rate of lowering the second and/or third threshold may be based on the rate of change in water level from the current level to the predicted level. For example, when the predicted water level is expected to rise relative to the current water level at a faster rate (faster rate of regeneration), the rate of decreasing the second and third thresholds may also correspondingly increase. Further, based on the expected change in exhaust temperature, an amount of temperature control relative to dilution control may be predicted and the rate of lowering the second threshold relative to the third threshold may be varied. For example, the second threshold may be lowered at a faster rate than the third threshold so that temperature control is assigned a higher priority earlier.

Figure 4:
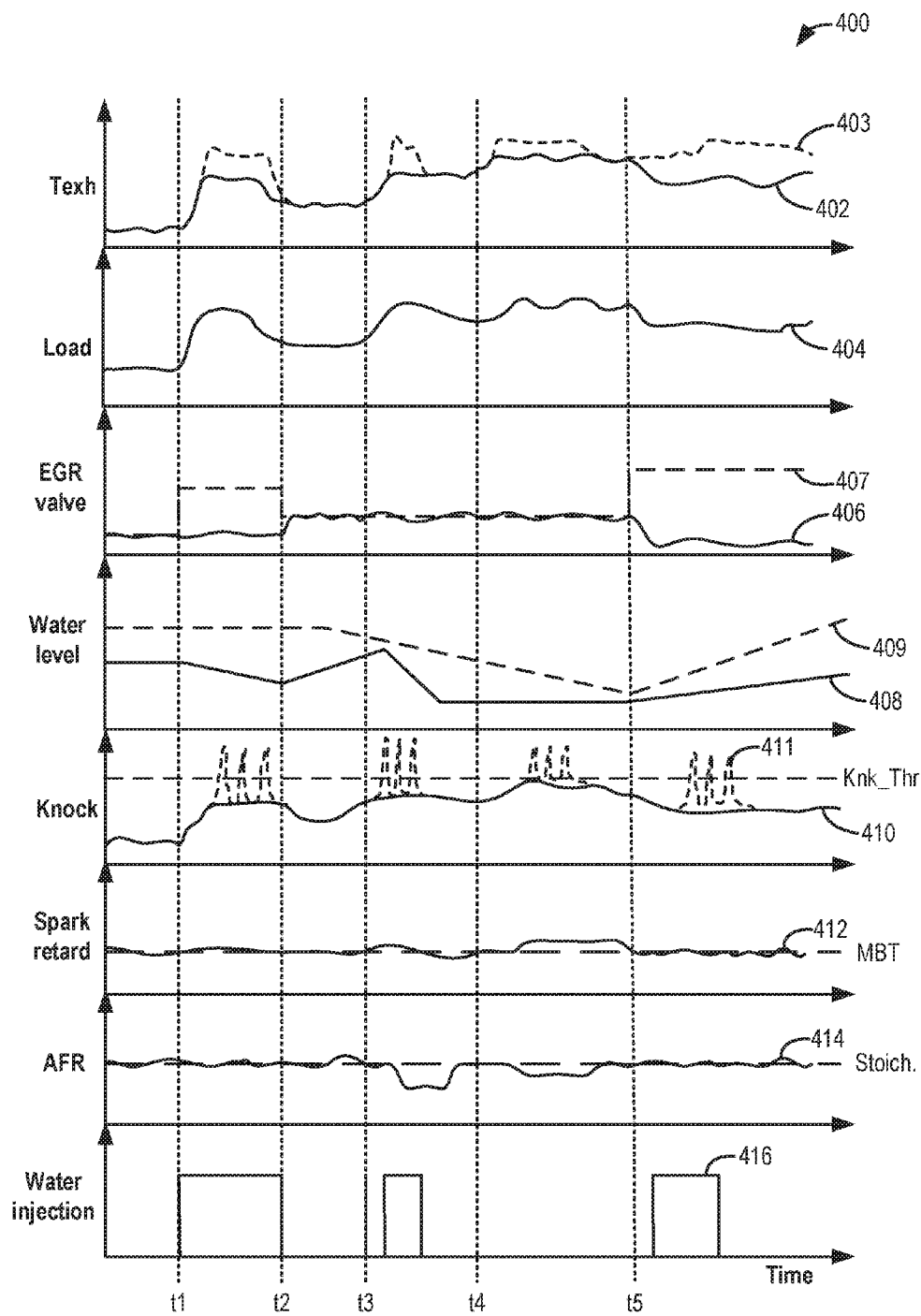
FIG. 4 shows an example water injection adjustment to maximize water usage when the water supply is limited.

An example of maximizing water usage based on current and predicted water levels is shown with reference to FIG. 4. Map 400 depicts exhaust temperature (Texh) at plot 402, engine load at plot 404, EGR flow (solid line) at plot 406 relative to engine dilution demand (dashed line) at plot 407, current water level in a water reservoir (solid line) at plot 408 relative to predicted future water level in the reservoir (dashed line) at plot 409, knock sensor output at plot 410 spark timing relative to MIBT at plot 412, combustion air-fuel ratio (AFR) relative to stoichiometry at plot 414, and water injection (enabled or disabled) at plot 416. All plots are depicted over time along the x-axis.

Prior to t1, the engine is operating at low loads, with lower exhaust temperatures. The EGR flow rate is adjusted to meet the lower dilution demand. The engine is not knock limited. Accordingly, based on the operating conditions, the engine is operating with no spark retard, and with an AFR at or around stoichiometry. Since knock relief and exhaust temperature relief is not required at this time, water injection is disabled. In addition, the lower dilution demand is met via the EGR flow. At this time, both the current and the predicted water levels are sufficiently high to supply water if water injection were enabled.

At t1, there is an increase in engine load to the mid load region, such as due to a rise in driver demand (e.g., due to an operator pedal tip-in event). In response to the increase in engine load, the engine becomes knock prone as the output of the knock sensor starts to move towards the knock threshold (Knk_Thr). In addition, the exhaust temperature starts to rise. Further, the engine dilution demand increases. At this time, due to both the current and the predicted water levels being sufficiently high, water injection is enabled. Water injection amounts are adjusted so as to provide knock relief first, then dilution control, and then exhaust temperature control. As such, if water were not injected, the engine knock frequency would have increased with the knock sensor output exceeding Knk_Thr, as indicated by dashed segment 411. Likewise, if water were not injected, the exhaust temperature would have increased to over-heated levels, as indicated by dashed line 403. By providing the dilution demand via the water injection, the EGR flow rate can be maintained at a lower level, allowing for improved combustion stability. By providing knock relief via water injection, spark timing can be maintained at MBT between t1 and t2. Likewise, by providing temperature relief via water injection, AFR can be maintained at stoichiometry between t1 and t2. As water is injected for engine control, the current water level starts to drop between t1 and t2. However, the predicted water level remains high in anticipation of water refill events and/or sufficient water generation on-board the vehicle over the current drive cycle.

Between t2 and t3, the engine load once again drops with a drop in knock propensity and exhaust temperature. Consequently, water injection for knock and temperature relief is disabled. There is also a decrease in dilution demand. Due to the drop in current water level between t1 and t2, the lower dilution demand is met via EGR flow adjustments (instead of via water injection), allowing for a faster increase in the current water level as water generation on-board the vehicle continues.

Shortly before t3, the predicted water level starts to fall, indicating that water availability in the future may be limited. In one example, the predicted water level may fall due to the vehicle navigating towards a region having lower ambient humidity and higher ambient temperature where there may be insufficient on-board water generation. In another example, the predicted water level may fall due to the limited availability of water refill stations with clean water in the navigation route.

At t3, there is an increase in engine load to the high load region, such as due to a rise in driver demand. In response to the increase in engine load, the engine becomes knock prone as the output of the knock sensor starts to move towards the knock threshold (Knk_Thr). In addition, the exhaust temperature starts to rise. The engine dilution demand remains at the lower level. Due to the current water level being sufficiently high but the predicted water level being low, the controller limits water usage at the current time so as to maximize water injection benefits. In particular, between t3 and t4, water injection is enabled for knock relief only. If water were not injected, the engine knock frequency would have increased with the knock sensor output exceeding Knk_Thr, as indicated by dashed segment 411. Due to the limited future water availability, exhaust temperature relief is provided by operating the engine with fuel enrichment, as indicated by the rich excursion of the AFR. The degree of richness of the rich excursion is adjusted as a function of the temperature relief required (indicated by the difference between solid line 402 and dashed line 403). In addition, the dilution demand is met via EGR flow adjustments only.

At this time, due to both the current and the predicted water levels being sufficiently high, water injection is enabled. Water injection amounts are adjusted so as to provide knock relief first, then dilution control, and then exhaust temperature control. As such, if water were not injected, the engine knock frequency would have increased with the knock sensor output exceeding Knk_Thr, as indicated by dashed segment 411. Likewise, if water were not injected, the exhaust temperature would have increased to over-heated levels, as indicated by dashed line 403. By providing the dilution demand via the water injection, the EGR flow rate can be maintained at a lower level, allowing for improved combustion stability. By providing knock relief via water injection, spark timing can be maintained at MBT between t1 and t2. Likewise, by providing temperature relief via water injection, AFR can be maintained at stoichiometry between t1 and t2. As water is injected for engine control, the current water level starts to drop between t1 and t2. However, the predicted water level remains high in anticipation of water refill events and/or sufficient water generation on-board the vehicle over the current drive cycle. As water is injected for engine knock control, the current water level starts to drop between t3 and t4.

At t4, both the current and the predicted water level are low. As a result, there may be insufficient water on-board the vehicle for engine control. Between t4 and t5, there is another increase in engine load. Due to the limited current and predicted water availability, at this time, water injection is temporarily disabled. Knock relief is provided by retarding spark timing from MBT. Temperature relief is provided by operating the engine with a richer than stoichiometry AFR. Engine dilution demand is met by EGR flow adjustments. At the same time, on-board water generation is increased, such as by increased exhaust heat/condensate recovery. As a result of the increased on-board water generation, the current water level starts to rise. In addition, the predicted water level starts to rise due to a change in predicted weather conditions along the travel route.

Accordingly, after t5, due to the availability of water, water injection for knock relief, temperature relief, and dilution control is re-enabled.

In this way, water usage for knock control, dilution control, and exhaust temperature control can be maximized. The technical effect of selecting whether to inject the amount of water corresponding to knock control, dilution control, or exhaust temperature control based on a comparison of current water level and/or predicted future water availability on-board the vehicle is that water usage can be reprioritized. This allows water usage to be restricted to conditions where the efficiency benefits of water usage are higher when water is limited. In addition, water usage for conditions where larger rates of water consumption are expected (such as during exhaust temperature control) can be limited. Overall, the use of water injection in an engine can be extended, even when water availability is limited and/or water quality is low. In addition, by using water for engine control, reliance on fuel enrichment and spark retard is reduced, providing fuel economy, exhaust emissions, and engine performance benefits.

One example method for a vehicle engine comprises: comparing a current water level in a water reservoir and/or a predicted water level over a vehicle drive cycle to a plurality of threshold water levels; and injecting water from the reservoir into the engine responsive to each of engine knock, dilution demand, and exhaust temperature based on the comparison. In the preceding example, additionally or optionally, the injecting includes: determining respective amounts of water to inject responsive to each of the knock, dilution demand, and exhaust temperature; selecting from among the respective amounts based on the comparison; and injecting the selected amount. In any or all of the preceding examples, additionally or optionally, the plurality of threshold water levels include a first threshold, a second threshold, and a third threshold, the second threshold lower than the first threshold, the third threshold lower than the second threshold. In any or all of the preceding examples, additionally or optionally, the injecting is further adjusted as a function of an estimated quality of water in the reservoir, the estimated quality based on one or more of a conductivity, particle content, dissolved mineral content, and pH of the water, the injecting disabled during a first condition where the estimated quality is lower than a threshold quality, and an engine operating window of the injecting widened during a second condition where the estimated quality is lower than the threshold quality. In any or all of the preceding examples, additionally or optionally, the method further comprises adjusting a degree of opening of an EGR valve responsive to the selecting, the adjusting including opening the EGR valve to a smaller degree when a third amount of water to inject for dilution demand is selected, and opening the EGR valve to a higher degree when the third amount of water to inject for dilution demand is not selected. In any or all of the preceding examples, additionally or optionally, injecting water into the engine includes one or more of port injecting water into an intake port of an engine cylinder, upstream of an intake valve, via a port water injector, direct injecting water into the engine cylinder, via a direct water injector, and central injecting water into an engine intake manifold, upstream or downstream of an intake throttle, via a central water injector. In any or all of the preceding examples, additionally or optionally, the method further comprises predicting a rate of water generation on-board the vehicle based on ambient temperature and humidity, cabin cooling demand, and EGR usage over the drive cycle; predicting a rate of water usage on-board the vehicle based on the ambient temperature and humidity, travel route, and operator drive history; and predicting the water level in the water reservoir over the drive cycle based on the predicted rate of water generation relative to the predicted rate of water usage. In any or all of the preceding examples, additionally or optionally, the engine is coupled in a vehicle, and wherein the water in the reservoir is refilled on-board the vehicle via a collection system, the collection system collecting condensate from one or more of an EGR cooler, a charge air cooler, an AC condenser, and a vehicle external surface. In any or all of the preceding examples, additionally or optionally, the injecting includes, when predicted water level exceeds the current water level; injecting water to satisfy knock control, dilution demand, and exhaust temperature control; when the predicted water level falls below the current water level by a first amount, continuing to inject water to satisfy knock control, limiting water injection to satisfy dilution demand, and discontinuing water injection for exhaust temperature control; when the predicted water level falls below the current water level by a second amount, larger than the first amount, continuing to inject water to satisfy knock control, and discontinuing each of water injection to satisfy dilution demand and exhaust temperature control; and when the current water level falls below the predicted water level by a third amount; larger than the second amount, independent of the predicted water level, discontinuing each of water injection to satisfy knock control, dilution demand, and exhaust temperature control. In any or all of the preceding examples, additionally or optionally, the method further comprises, responsive to the limiting or discontinuing of water injection to satisfy dilution demand, increasing recirculation of exhaust gas from the engine exhaust to the engine intake, responsive to the discontinuing of water injection for exhaust temperature control, operating the engine richer than stoichiometry, and responsive to the discontinuing of water injection for knock control, operating the engine with spark timing retard.

In a further representation of the above example method, the injecting includes, when the current and predicted water level exceeds a first threshold, injecting water to satisfy knock control, dilution demand, and exhaust temperature control; when the current and predicted water level falls below the first threshold but above a second threshold, continuing to inject water to satisfy knock control, limiting water injection to satisfy dilution demand, and discontinuing water injection for exhaust temperature control; when the current and predicted water level falls below the second threshold but above third threshold, continuing to inject water to satisfy knock control, and discontinuing each of water injection to satisfy dilution demand and exhaust temperature control; and when the current water level falls below the third threshold, independent of the predicted water level, discontinuing each of water injection to satisfy knock control, dilution demand, and exhaust temperature control. In yet another further representation, additionally or optionally, the current water level in the water reservoir is based on a liquid level sensor.

Another example method for a vehicle engine comprises: determining first, second, and third amounts of water to inject into the engine responsive to each of knock, dilution demand, and exhaust temperature, respectively; in response to water level in a water reservoir coupled to a water injector being higher than a first threshold, injecting the first amount of water responsive to knock, then the second amount of water responsive to exhaust temperature, and then the third amount of water responsive to engine dilution demand; in response to the water level being higher than a second threshold but lower than the first threshold, injecting the first amount of water responsive to knock, then the second amount of water responsive to exhaust temperature, and not the third amount of water responsive to engine dilution demand; in response to the water level being higher than a third threshold but lower than the second threshold, injecting only the first amount of water responsive to knock, but not the second amount of water responsive to exhaust temperature or the third amount of water responsive to engine dilution demand; and in response to the water level being lower than each of the first, second, and third threshold, temporarily disabling water injection. In the preceding example, additionally or optionally, the first, second, and third amounts of water are injected into distinct locations of the engine, wherein the water level is a current water level, and wherein each of the first, second, and third threshold is based on a predicted water level in the water reservoir. In any or all of the preceding examples, additionally or optionally, the current water level is estimated as function of a current rate of water usage relative to a current rate of water generation on-board the vehicle, and wherein the predicted water level is estimated as function of a predicted rate of water usage relative to each of a predicted rate of water generation on-board the vehicle and a predicted water refill event. In any or all of the preceding examples, additionally or optionally, the current rate of water usage is determined as a first function of ambient temperature, ambient humidity, travel route, and operator drive history, and wherein the predicted rate of water usage is determined as a second, different function of ambient temperature, ambient humidity, travel route, and operator drive history. In any or all of the preceding examples, additionally or optionally, water is generated on-board the vehicle via a collection system collecting condensate from one or more of an EGR cooler, a charge air cooler, an AC condenser, and a vehicle external surface, and wherein water is further refilled manually into the reservoir from a water source off-board the vehicle. In any or all of the preceding examples, additionally or optionally, each of the first, second, and third threshold is further adjusted based on an estimated quality of water in the water reservoir, each of the first, second, and third threshold lowered as the estimated quality falls below a threshold quality. In any or all of the preceding examples, additionally or optionally, the method further comprises opening an EGR valve to a first, less open position responsive to the third amount of water being injected; and opening the EGR valve to a second, more open position responsive to the third amount of water not being injected.

Another example vehicle system comprises: an engine including an intake manifold and an exhaust manifold; an exhaust catalyst coupled to the exhaust manifold; an EGR passage including an EGR valve for recirculating exhaust gas from the exhaust manifold to the intake manifold; a water injection system including a water reservoir, a water injector, and a water collection system; a water level sensor coupled to the water reservoir; a knock sensor coupled to the engine; and a controller. The controller is configured with computer readable instructions stored on non-transitory memory for comparing a current water level in the reservoir to a predicted water level after a duration of vehicle operation; determining respective amounts of water to inject into the engine responsive to each of knock, dilution demand, and exhaust temperature; selecting an amount of water to inject from among the respective amounts based on the comparing; delivering the selected amount of water via the water injector; and adjusting an opening of the EGR valve based on the dilution demand relative to the selected amount of water.

In a further representation of the preceding vehicle system, the controller may include further instructions for: if the predicted water level is higher than the current water level, continuing to inject water responsive to knock, then responsive to catalyst temperature, and then responsive to engine dilution demand; if the predicted water level is lower than the current water level by a smaller amount, injecting water responsive to knock, then responsive to catalyst temperature, and not responsive to engine dilution demand; and if the predicted water level is lower than the current water level by a larger amount, injecting water responsive to knock, not responsive to engine dilution demand, and not responsive to catalyst temperature. In another representation of the preceding vehicle system, the controller may include further instructions for: if the current water level is lower than a threshold, independent of the predicted water level, temporarily disabling the water injection. In still another representation of the preceding vehicle system, the controller may include further instructions for: when the predicted water level is lower than the current water level by the smaller amount, increasing an opening of the EGR valve based on the dilution demand; and when the predicted water level is lower than the current water level by the larger amount, increasing the opening of the EGR valve based on the dilution demand, and operating the engine with an air-fuel ratio richer than stoichiometry, a degree of richness based on the catalyst temperature. In yet another representation of the preceding vehicle system, the system may further comprise a water quality sensor, such as a conductivity sensor coupled to the water reservoir for estimating a quality of the water in the reservoir, and the controller may include further instructions for: when the estimated quality of the water is lower than a threshold, changing usage of water responsive to each of knock, dilution demand, and catalyst temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle engine, comprising:
   comparing a current water level in a water reservoir and a predicted water level in the reservoir over a vehicle drive cycle to a plurality of threshold water levels; and
   injecting water from the reservoir into the engine responsive to each of engine knock, dilution demand, and exhaust temperature based on the comparison.

2. The method of claim 1, wherein the injecting includes:
   determining respective amounts of water to inject responsive to each of the knock, dilution demand, and exhaust temperature;
   selecting from among the respective amounts based on the comparison; and
   injecting the selected amount.

3. The method of claim 2, wherein the plurality of threshold water levels include a first threshold, a second threshold, and a third threshold, the second threshold lower than the first threshold, the third threshold lower than the second threshold.

4. The method of claim 3, wherein each of the first, second, and third thresholds are adjusted based on the current water level relative to the predicted water level.

5. The method of claim 4, wherein the adjusting includes raising the second and third threshold relative to the first threshold as the predicted water level falls relative to the current water level, a rate of the raising determined as a function of a rate of the predicted water level falling relative to the current water level, the rate of raising increased as the rate of the predicted water level falling relative to the current water level increases.

6. The method of claim 2, wherein the injecting is further adjusted as a function of an estimated quality of water in the reservoir, the injecting disabled during a first condition where the estimated quality is lower than a threshold quality, and an engine operating window of the injecting widened during a second condition where the estimated quality is lower than the threshold quality.

7. The method of claim 1, further comprising, adjusting a degree of opening of an EGR valve responsive to the selecting, the adjusting including opening the EGR valve to a smaller degree when a third amount of water to inject for dilution demand is selected, and opening the EGR valve to a higher degree when the third amount of water to inject for dilution demand is not selected.

8. The method of claim 1, wherein injecting water into the engine includes one or more of port injecting water into an intake port of an engine cylinder, upstream of an intake valve, via a port water injector, direct injecting water into the engine cylinder, via a direct water injector, and central injecting water into an engine intake manifold, upstream or downstream of an intake throttle, via a central water injector.

9. The method of claim 1, further comprising:
predicting a rate of water generation on-board the vehicle based on ambient temperature and humidity, cabin cooling demand, and EGR usage over the drive cycle;
predicting a rate of water usage on-board the vehicle based on the ambient temperature and humidity, travel route, and operator drive history; and
predicting the water level in the water reservoir over the drive cycle based on the predicted rate of water generation relative to the predicted rate of water usage.

10. The method of claim 1, wherein the engine is coupled in a vehicle; and wherein the water in the reservoir is refilled on-board the vehicle via a collection system, the collection system collecting condensate from one or more of an EGR cooler, a charge air cooler, an AC condenser, and a vehicle external surface.

11. The method of claim 1, wherein the injecting includes:
when the predicted water level exceeds the current water level, injecting water to satisfy knock control, dilution demand, and exhaust temperature control;
when the predicted water level falls below the current water level by a first amount, continuing to inject water to satisfy knock control, limiting water injection to satisfy dilution demand, and discontinuing water injection for exhaust temperature control;
when the predicted water level falls below the current water level by a second amount, larger than the first amount, continuing to inject water to satisfy knock control, and discontinuing each of water injection to satisfy dilution demand and exhaust temperature control; and
when the current water level falls below the predicted water level by a third amount, larger than the second amount, discontinuing each of ter injection to satisfy knock control, dilution demand, and exhaust temperature control.

12. The method of claim 11, further comprising, responsive to the limiting or discontinuing of water injection to satisfy dilution demand, increasing recirculation of exhaust gas from the engine exhaust to the engine intake, responsive to the discontinuing of water injection for exhaust temperature control, operating the engine richer than stoichiometry, and responsive to the discontinuing of water injection for knock control, operating the engine with spark ing retard.

13. A method for a vehicle engine, comprising:
determining first, second, and third amounts of water to inject into the engine responsive to each of knock, dilution demand, and exhaust temperature, respectively;
in response to water level in a water reservoir coupled to a water injector being higher than a first threshold, injecting the first amount of water responsive to knock, then the second amount of water responsive to exhaust temperature, and then the third amount of water responsive to engine dilution demand;
in response to the water level being higher than a second threshold but lower than the first threshold, injecting the first amount of water responsive to knock, then the second amount of water responsive to exhaust temperature, and not the third amount of water responsive to engine dilution demand;
in response the water level being higher than a third threshold but lower than the second threshold, injecting only the first amount of water responsive to knock, but not the second amount of water responsive to exhaust temperature or the third amount of water responsive to engine dilution demand; and
in response to the water level being lower than each of the first, second, and third threshold, temporarily disabling water injection.

14. The method of claim 13, wherein the first, second, and third amounts of water are injected into distinct locations of the engine, wherein the water level is a current water level, and wherein each of the first, second, and third threshold is based on a predicted water level in the water reservoir.

15. The method of claim 14, wherein the current water level is estimated as function of a current rate of water usage relative to a current rate of water generation on-board the vehicle, and wherein the predicted water level is estimated as function of a predicted rate of water usage relative to each of a predicted rate of water generation on-board the vehicle and a predicted water refill event.

16. The method of claim 15, wherein the current rate of water usage is determined as a first function of ambient temperature, ambient humidity, travel route, and operator drive history, and wherein the predicted rate of water usage is determined as a second, different function of ambient temperature, ambient humidity, travel route, and operator drive history.

17. The method of claim 16, wherein water is generated on-board the vehicle via a collection system collecting condensate from one or more of an EGR cooler, a charge air cooler, an AC condenser, and a vehicle external surface, and wherein water is further refilled manually into the reservoir from a water source off-board the vehicle.

18. The method of claim 15, wherein each of the first, second, and third threshold is further adjusted based on an estimated quality of water in the water reservoir, each of the first, second, and third threshold lowered as the estimated quality falls below a threshold quality.

19. The method of claim 13, further comprising:
opening an EGR valve to a first, less open position responsive to the third amount of water being injected; and
opening the EGR valve to a second; more open position responsive to the third amount of water not being injected.

20. A vehicle system, comprising:
an engine including an intake manifold and an exhaust manifold;
an exhaust catalyst coupled to the exhaust manifold;
an EGR passage including an EGR valve for recirculating exhaust gas from the exhaust manifold to the intake manifold;
a water injection system including a water reservoir, a water injector, and a water collection system;
a water level sensor coupled to the water reservoir;
a knock sensor coupled to the engine; and
a controller with computer readable instructions stored on non-transitory memory for:
comparing a current water level in the reservoir to a predicted water level after a duration of vehicle operation;
determining respective amounts of water to inject into the engine responsive to each of knock, dilution demand, and exhaust temperature;
selecting an amount of water to inject from among the respective amounts based on the comparing;
delivering the selected amount of water via the water injector; and adjusting an opening of the EGR valve based on the dilution demand relative to the selected amount of water.

* * * * *